(12) United States Patent
Murayama

(10) Patent No.: US 7,536,519 B2
(45) Date of Patent: May 19, 2009

(54) MEMORY ACCESS CONTROL APPARATUS AND METHOD FOR ACCOMODATING EFFECTS OF SIGNAL DELAYS CAUSED BY LOAD

(75) Inventor: Kohei Murayama, Koto-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 11/143,825

(22) Filed: Jun. 2, 2005

(65) Prior Publication Data

US 2005/0273566 A1    Dec. 8, 2005

(30) Foreign Application Priority Data

Jun. 3, 2004    (JP) .............................. 2004-166339

(51) Int. Cl.
*G06F 12/00*    (2006.01)
(52) U.S. Cl. ............................ 711/154; 711/5; 711/105; 711/167; 711/170
(58) Field of Classification Search ................. 711/154, 711/5, 105, 167, 170
See application file for complete search history.

(56) References Cited

U.S. PATENT DOCUMENTS

| | | | |
|---|---|---|---|
| 5,577,236 A * | 11/1996 | Johnson et al. | 713/400 |
| 6,496,911 B1 * | 12/2002 | Dixon et al. | 711/170 |
| 6,981,089 B2 * | 12/2005 | Dodd et al. | 710/308 |
| 2005/0193183 A1 * | 9/2005 | Barth et al. | 711/170 |
| 2006/0129739 A1 * | 6/2006 | Lais et al. | 711/5 |

FOREIGN PATENT DOCUMENTS

| | | |
|---|---|---|
| JP | 8-321761 A | 12/1996 |
| JP | 2003-345652 A | 12/2003 |

* cited by examiner

*Primary Examiner*—Stephen C Elmore
(74) *Attorney, Agent, or Firm*—Canon U.S.A., Inc., IP Division

(57) ABSTRACT

A memory controller determines a load level based on the number of connected memory devices informed by a switch or the like. If it is determined that the load level is high, the memory controller increases the number of cycles for issuing command/address signals, and if it is determined that the load level is low, the memory controller reduces the number of issuing cycles.

21 Claims, 9 Drawing Sheets

FIG. 3 Relevant Art
--Prior Art--

MEMORY ACCESS CONTROL APPARATUS AND METHOD FOR ACCOMODATING EFFECTS OF SIGNAL DELAYS CAUSED BY LOAD

BACKGROUND OF THE INVENTION

1. Field of the Invention

The present invention relates to a memory access control apparatus and method for controlling access to a memory device to be connected to a large-scale integration (LSI) device or the like.

2. Description of the Related Art

A dynamic random access memory (DRAM) is a recent example of a memory device to be connected to an LSI device or the like. Of DRAMs, a synchronous DRAM (SDRAM) passing and receiving addresses, commands, and data in synchronization with clock signals is widely used as a device that allows for high-speed access.

Methods for connecting a memory device to an LSI include the implementation of a memory device on a printed board for an LSI such that the memory device is directly connected to the LSI, and the implementation of a socket specifically designed to accommodate a module, such as a dual inline memory module (DIMM), on a printed board for an LSI such that a memory device is connected to the LSI via the socket.

In general, the former method is used for a system requiring less memory, while the latter method is used for a system requiring large amounts of memory so that memory devices can be added to the socket depending on the amount of memory required.

For the load level on a memory interface port, there is a significant difference between the case where a memory device is directly implemented on an LSI board, and the case where a memory device is connected to an LSI board via a socket specifically designed to accommodate a DIMM (hereinafter referred to as a DIMM socket). For example, for connecting a 64-bit bus SDRAM, two sets of memory devices, each having a data bus width of 32 bits, are implemented on the printed board, in the case of a system requiring less memory, whereas, in a system provided with a DIMM socket, a DIMM module with 16 sets of memory devices, each having a data bus width of 8 bits, is used.

In the former case, the load level for a data bus signal is 2, and the load level for a command/address signal is 3, whereas in the latter case, the load level for a data bus signal is 3, and the load level for a command/address signal is 17. Moreover, for the latter case, in a system provided with two sets of DIMM sockets, the load levels for a data bus signal and a command/address signal, although depending on the DIMM module used, are 5 and 33, respectively, at the maximum. In other words, for a memory device directly implemented on a printed board, there is only a small difference between a data bus signal and a command/address signal in terms of the load level, whereas for a system provided with a DIMM module, there is a large difference between a data bus signal and a command/address signal in terms of the load level.

An increase in load on a signal line causes a rise and fall of a signal waveform to become less steep. In this case, for example, in switching between Low and High levels for a short period of time, it tends to take more time for each signal to be determined. When the frequency of signal changes increases, each signal cannot be determined within a cycle expected from the control side. This is fatal to a system that passes and receives addresses, commands, and data in synchronization with clock signals.

Systems requiring large amounts of memory are becoming more common, especially in recent years. Consequently, since the load level for a command/address signal increases, it is becoming difficult to maintain synchronization between a data signal and a command/address signal while keeping a proper relationship therebetween.

A method to ensure the synchronization under heavy load conditions is to adjust the drive capability of an output buffer on the LSI side (see Japanese Patent Laid-Open No. 8-321761). According to this method, even if the load level for each signal increases, enhancing the drive capability of the output buffer can reduce a signal delay.

For load reduction, there is a method using a registered DIMM (see Japanese Patent Laid-Open No. 2003-345652). In this method, a command/address signal is temporarily stored in a register on the DIMM module side, and then transmitted to a port for a command/address signal in each device in the DIMM module. Load reduction can be achieved by temporarily storing a command/address signal in the register, since split signals are received at a single port.

However, in the above-described method to ensure the synchronization, it is extremely difficult, only by adjusting the drive capability of the output buffer, to perform control covering all combinations of various numbers of DIMM modules and various numbers of memory devices in each DIMM module. Therefore, in a system requiring large amounts of memory, it is extremely difficult by this method to eliminate the negative effects of a delay and less steep curve of signals.

As for the above-described method for load reduction, there is a problem in that the implementation of the register on the DIMM module results in increased costs of the module and system.

SUMMARY OF THE INVENTION

The present invention is directed to a memory access control apparatus and method that can accommodate the effects of command/address signal delays caused by the load when many memory devices are connected.

The present invention is also directed to an information processing system that can not only accommodate the effects of command/address signal delays caused by the load when many memory devices are connected, but also can allow for the connection of many memory devices without using expensive memory modules.

According to one aspect, the present invention relates to a memory access control apparatus including an obtaining unit configured to obtain a load state corresponding to the number of memory devices; setting means for setting, based on the load state, the cycle of issuing signals for controlling access to the memory devices; and a control unit configured to control access to the memory devices by issuing the signals at the set issuing cycle.

According to another aspect, the present invention relates to a memory access control apparatus including: an obtaining unit configured to obtain a load state corresponding to the number of memory devices; a determining unit configured to determine, based on the load state, a state transition for command processing; and an access control unit configured to control an access operation to the memory devices based on the state transition.

According to still another aspect, the present invention relates to a memory access control method including: obtaining a load state corresponding to the number of memory devices; setting, based on the load state, the cycle of issuing signals for controlling access to the memory devices; and controlling access to the memory devices by issuing the signals at the set issuing cycle.

According to yet another aspect, the present invention relates to a memory access control method including: obtaining a load state corresponding to the number of memory devices; determining, based on the load state, a state transition for command processing; and controlling an access operation to the memory devices based on the state transition.

Other aspects and advantages in addition those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

Embodiments of the present invention will now be described in detail with reference to the accompanying drawings.

First Embodiment

Figure 1:
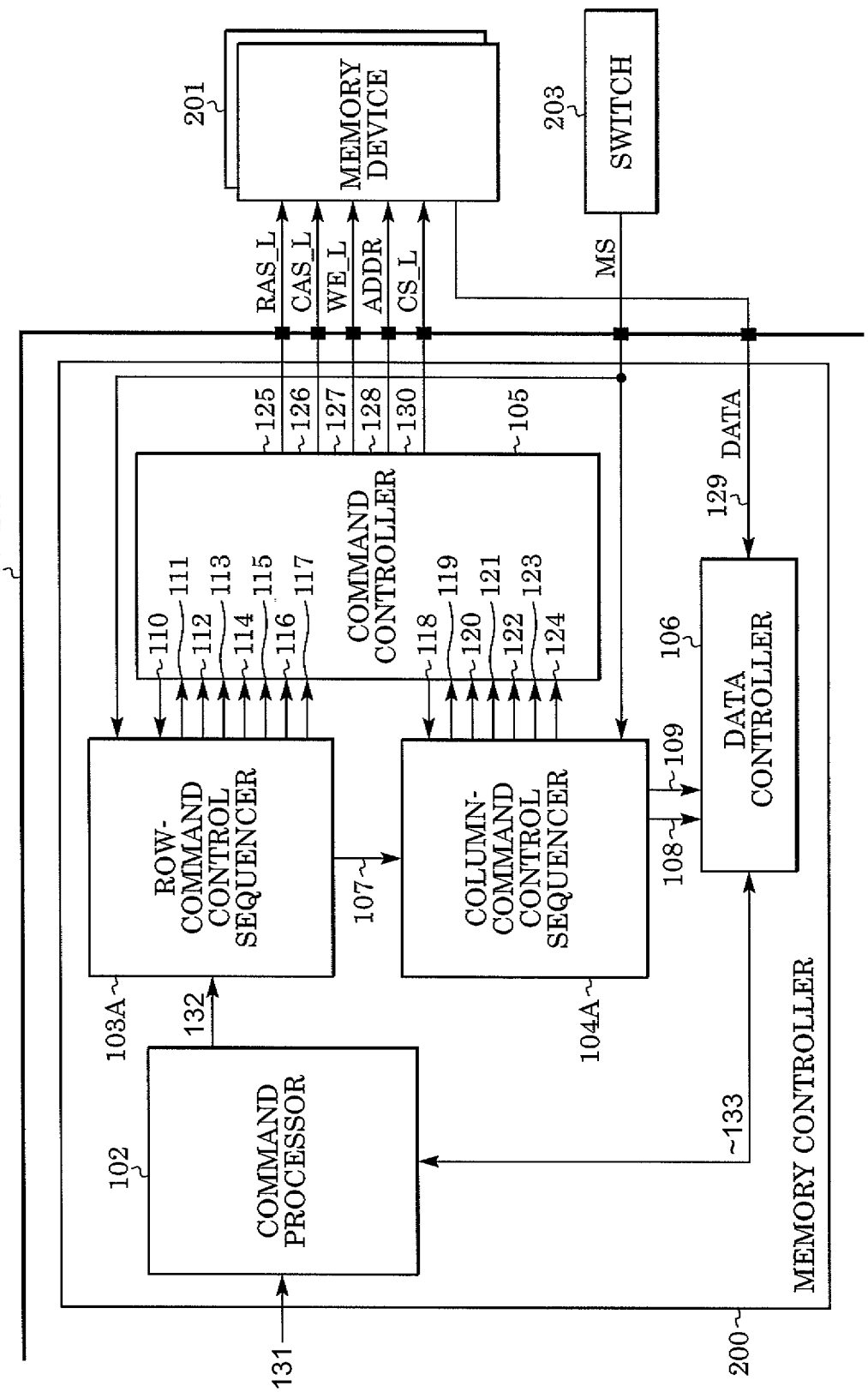
FIG. 1 is a block diagram showing the configuration of a memory controller according to a first embodiment of the present invention.
Figure 2:
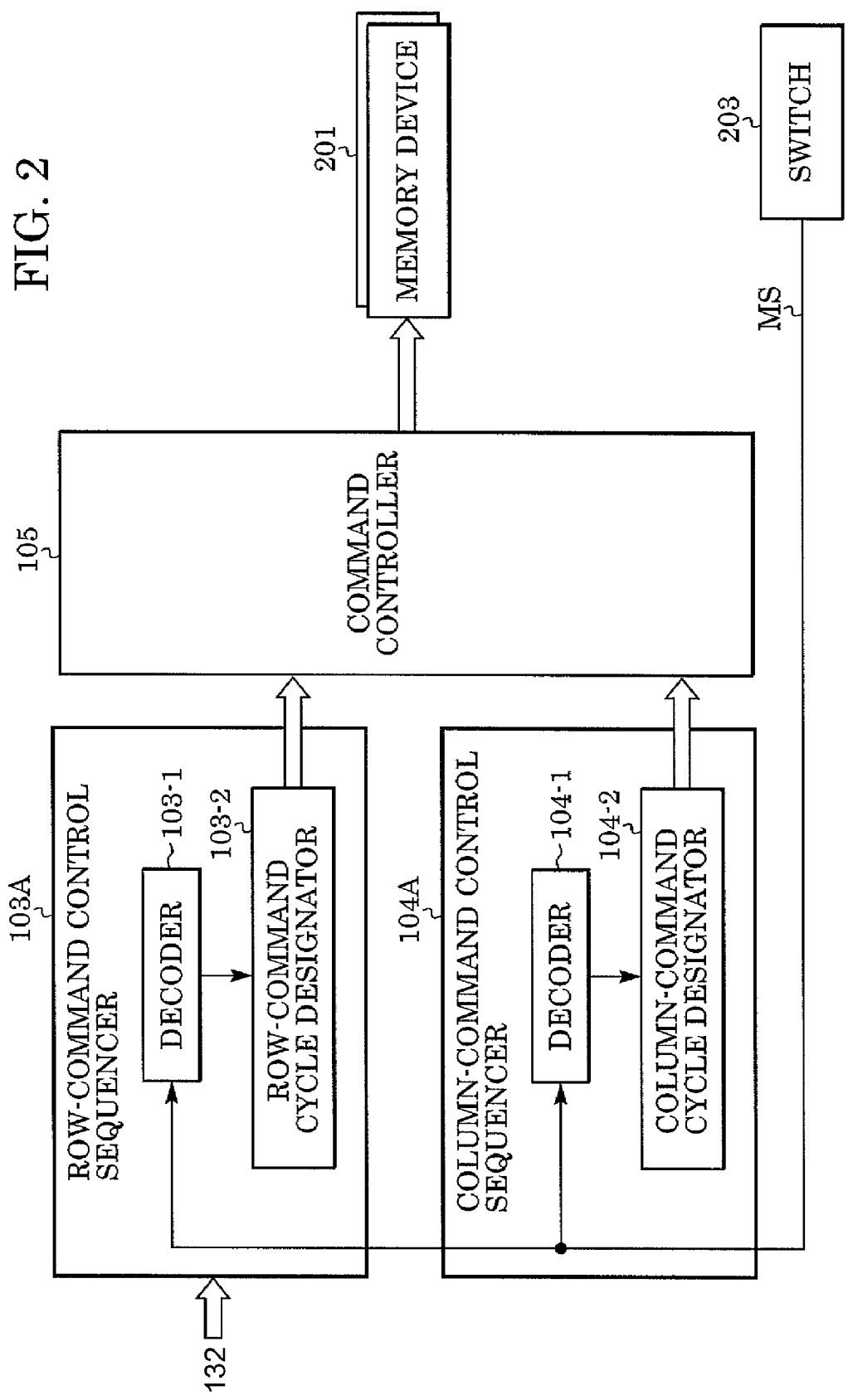
FIG. 2 is a block diagram showing a distinctive part of the memory controller in FIG. 1.
Figure 3:
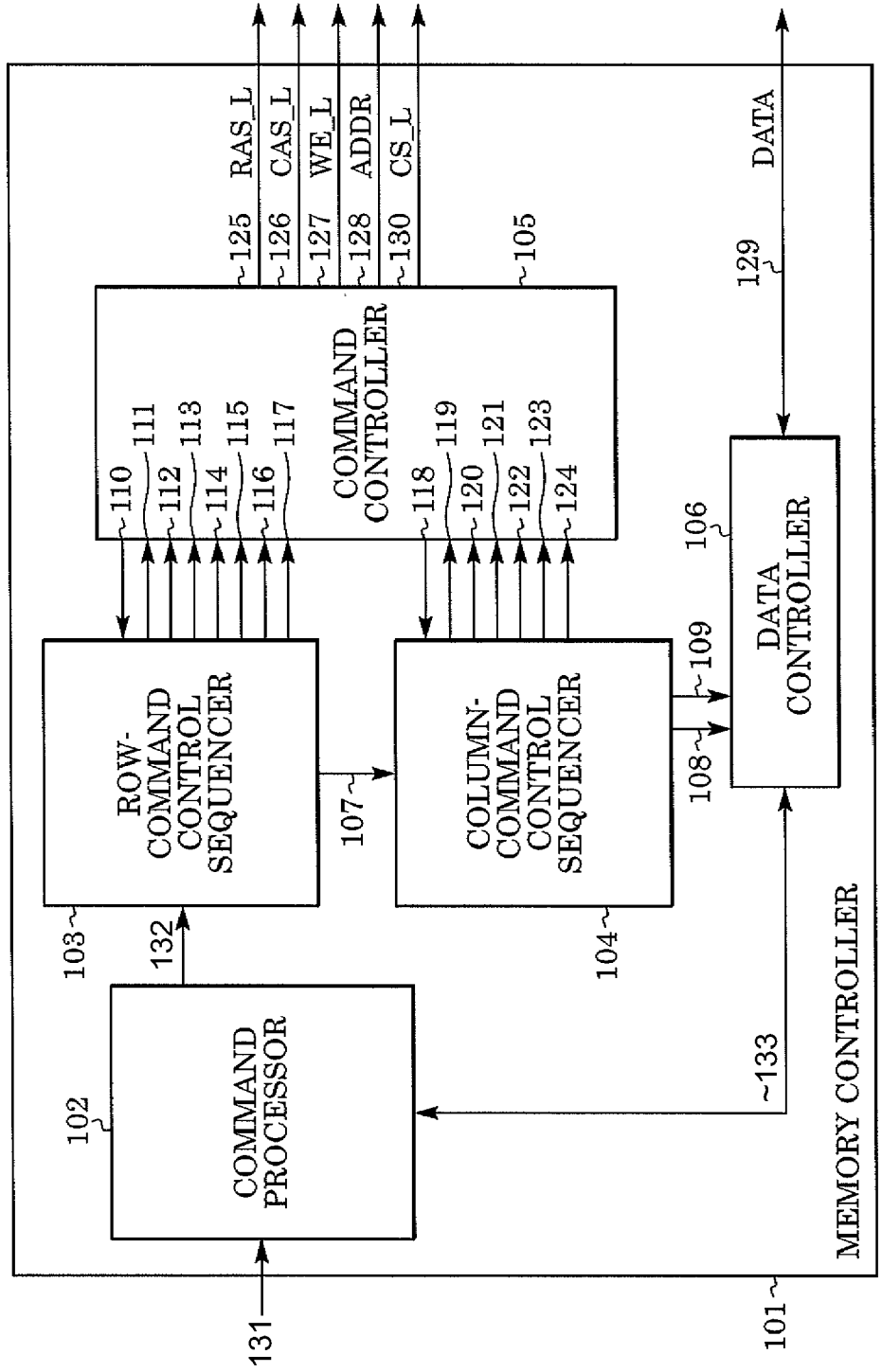
FIG. 3 is a block diagram showing a configuration example of a known memory controller.

FIG. 1 is a block diagram showing the configuration of a memory controller including a memory access control apparatus according to the first embodiment of the present invention. FIG. 2 is a block diagram showing a distinctive part of the memory controller in FIG. 1. FIG. 3 is a block diagram showing a configuration example of a known memory controller.

<Configuration Example of Known Memory Controller>

First, a configuration example of a known memory controller will be described with reference to FIG. 3.

A memory controller 101 in FIG. 3 controls access to an external memory device, such as an SDRAM, connected to an LSI. The memory controller 101 includes a command processor 102, a row-command control sequencer 103, a column-command control sequencer 104, a command controller 105, and a data controller 106.

The command processor 102 serves as an interface for receiving commands from a master device in the LSI via a line 131, decodes access commands to the memory device, and performs refresh control. In addition, the command processor 102 provides mechanisms for various settings of the memory controller 101, for page management within the memory device, and for the determination of a page hit or a page miss. The "refresh" here means periodic rewriting of data during the time before the data is lost due to the discharge of the signal electric charge.

Commands transferred from the master device and decoded by the command processor 102 are sent to the row-command control sequencer 103 via a line 132 in the case of a page miss, whereas sent to the column-command control sequencer 104 in the case of a page hit. Refresh commands and the like are sent to the row-command control sequencer 103.

The row-command control sequencer 103 controls row commands for the memory device, such as an activation (Active) command, a refresh (Refresh) command, and a precharge (Precharge) command. The activation command is a command for causing each access circuit receiving access requests to enter an active state. The refresh command is a command for performing refresh. The precharge command is a command for precharging signal lines (bit lines) connected to memory cells in which data of "1" or "0" is stored.

That is, the row-command control sequencer 103 is a sequencer that receives commands issued from the command processor 102 and performs specified row-command control. The row-command control sequencer 103 outputs a chip select signal (CS signal) 117, a row-address strobe signal (RAS signal) 112, a column-address strobe signal (CAS signal) 113, a write enable signal (WE signal) 114, and an address 115, which are issued as row commands, to a command controller 105, together with a row-command drive signal 116.

The row-command control sequencer 103 sends a command issue request 111, for the row commands, to the command controller 105 and receives command issue permission 110, thereby performing state transition. The row-command control sequencer 103 issues and sends commands, together with the row-command drive signal 116 according to the result of transition, to the command controller 105. When the command processor 102 provides an instruction to perform read access or write access, the instruction together with commands are transmitted, after activation processing, to the column-command control sequencer 104.

The column-command control sequencer 104 controls column commands for the memory device, such as a read (Read) command and a write (Write) command. The read command is a command for reading data from the memory device, while the write command is a command for writing data to the memory device.

The column-command control sequencer 104 is a sequencer that receives the commands from the command processor 102 or the row-command control sequencer 103 and performs specified column-command control. The column-command control sequencer 104 outputs a CS signal 124, a CAS signal 120, a WE signal 121, an address 122, which are issued as column commands, to a command controller 105, together with a column-command drive signal 123. Furthermore, the column-command control sequencer 104 sends a command issue request 119, for the column commands, to the command controller 105 and receives command issue permission 118, thereby performing state transition. The column-command control sequencer 104 issues and sends commands, together with the column-command drive signal 123, to the command controller 105.

The command controller 105 receives the commands from the row-command control sequencer 103 and the column-command control sequencer 104, selects row commands and column commands, and outputs an RAS signal 125, a CAS signal 126, a WE signal 127, an address 128, and a CS signal 130 to the memory device.

The command controller 105 receives the command issue request 111 from the row-command control sequencer 103, and the command issue request 119 from the column-command control sequencer 104. The command controller 105 issues the command issue permission 110 and the command issue permission 118 to the row-command control sequencer 103 and the column-command control sequencer 104, respectively, if it is determined, according to the memory bus state and the issue timing of each command, that the row commands and column commands can be issued.

During the period in which the row-command drive signal 116 is issued, the command controller 105 issues the CS signal 117, the RAS signal 112, the CAS signal 113, the WE signal 114, and the address 115, which are from the row-command control sequencer 103, to the memory device. Moreover, during the period in which the column-command drive signal 123 is issued, the command controller 105 issues the CS signal 124, the CAS signal 120, the WE signal 121, and the address 122, which are from the column-command control sequencer 104, to the memory device. The RAS signal 125 is not activated (High level is outputted) during the period in which the RAS signal 125 is issued.

The data controller 106 processes write data and read data to and from the memory device. The write data is loaded into the data controller 106 when the write command is received from the command processor 102 via a line 132, and is outputted to a memory bus 129 in response to an output-data timing signal 108 from the column-command control sequencer 104. The read data is loaded from the memory bus 129, according to an input-data timing signal 109 issued from the column-command control sequencer 104 during read operation, and CAS latency (waiting time for the CAS signal) specified by the command processor 102, and is transmitted to the command processor 102 via the line 132.

<Memory Controller of First Embodiment>

The first embodiment, based on the known memory controller 101 described above, will now be described with reference to FIG. 1 and FIG. 2.

As shown in FIG. 1, a memory controller 200 of the present embodiment, instead of the known memory controller 101, is arranged in an LSI 100. The configurations of a row-command control sequencer 103A and a column-command control sequencer 104A are particularly different from the configurations of the corresponding sequencers for the known memory controller 101.

A system having the memory controller 200 is provided with a device-number selector switch 203 outside the LSI 100. The device-number selector switch 203 outputs a mode selector signal MS corresponding to the number of connected memory devices 201. The mode selector signal MS from the device-number selector switch 203 is inputted to the row-command control sequencer 103A and the column-command control sequencer 104A. The mode selector signal MS is set, by the device-number selector switch 203, to the Low level if the number of the memory devices 201 connected to the LSI 100 is 16 or less, while set to the High level if the number of the memory devices 201 connected to LSI 100 is more than 16.

As shown in FIG. 2, the row-command control sequencer 103A includes a decoder 103-1 and a row-command cycle designator 103-2, while the column-command control sequencer 104A includes a decoder 104-1 and a column-command cycle designator 104-2. When the mode selector signal MS is at the High level, the decoder 103-1 and the decoder 104-1 determine that the load level is high, and when the mode selector signal MS is at the Low level, the decoder 103-1 and the decoder 104-1 determine that the load level is low.

Based on the load level determined by the decoder 103-1 and the decoder 104-1, the row-command cycle designator 103-2 and the column-command cycle designator 104-2 change the states of the row-command control sequencer 103A and the column-command control sequencer 104A, respectively. That is, if it is determined that the load level is high, the state transition is performed to increase the number of clock cycles for the output of the address and commands, whereas if it is determined that the load level is low, the state transition is performed to reduce the number of clock cycles for the output of the address and commands.

<Operation of First Embodiment>

The operation of the first embodiment will now be described with reference to FIGS. 4 to 7.

Figure 4:
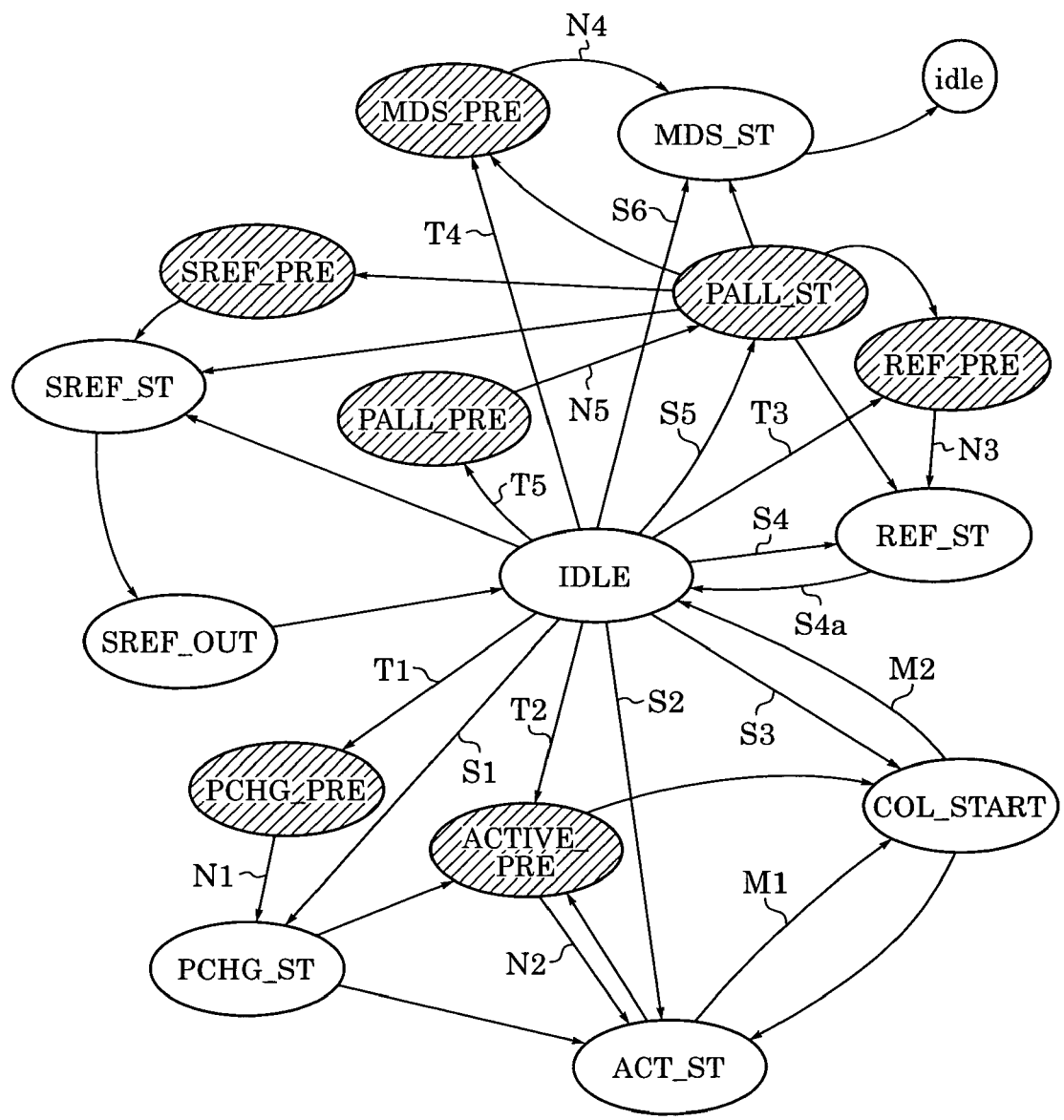
FIG. 4 is a state transition diagram of a row-command control sequencer.
Figure 5:
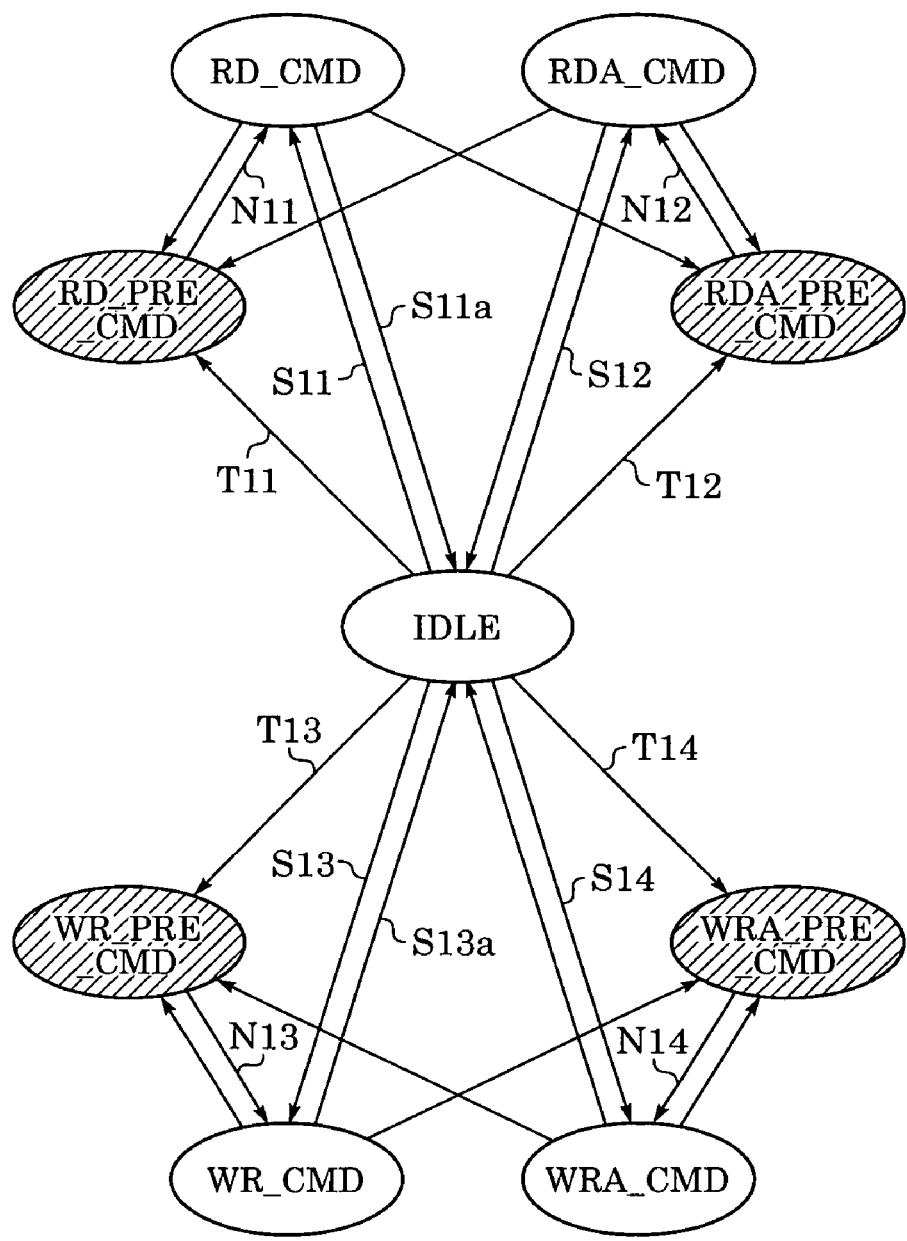
FIG. 5 is a state transition diagram of a column-command control sequencer.
Figure 6:
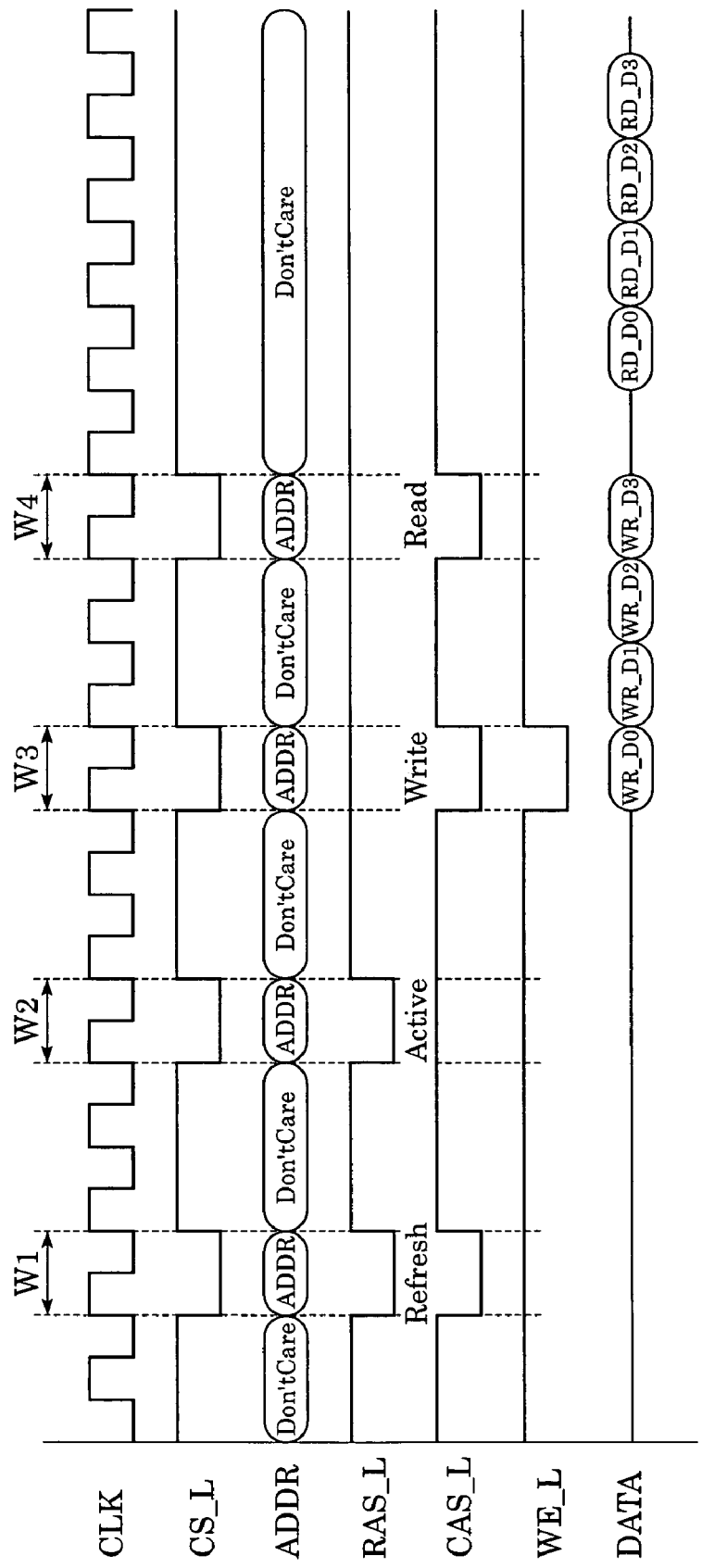
FIG. 6 is a timing chart showing the operation when the load level is low.
Figure 7:
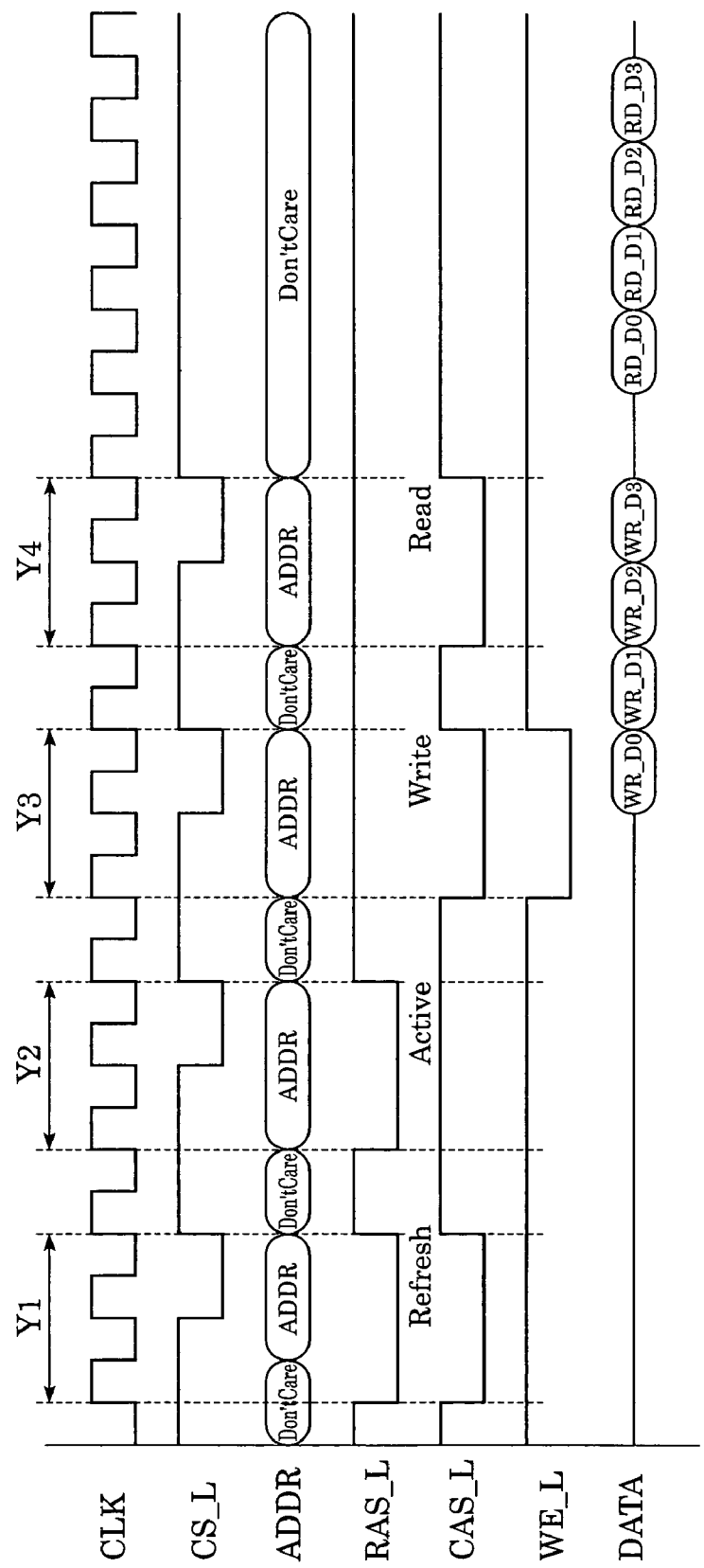
FIG. 7 is a timing chart showing the operation when the load level is high.

FIG. 4 is a state transition diagram of the row-command control sequencer 103A, and FIG. 5 is a state transition diagram of the column-command control sequencer 104A. FIG. 6 is a timing chart showing the operation when the load level is low. FIG. 7 is a timing chart showing the operation when the load level is high.

I. Operation of Row-Command Control Sequencer 103A

Upon receipt of a command from the command processor 102, the row-command control sequencer 103A issues the command issue request 111 to the command controller 105. When the command issue permission 110 is received, a state transition from a command standby state (hereinafter referred to as an IDLE state) to a command-issuing state takes place.

As shown in FIG. 4, the row-command control sequencer 103A has the states of issuing an activation command, a precharge command, a refresh command, an all-precharge (Precharge ALL) command, a mode-setting (ModeSet) command, and a self-refresh (SelfRefresh) command. Moreover, the row-command control sequencer 103A has their previous states before the transitions to the respective states, and has a column-command drive state (indicated by COL_START in FIG. 4) where commands are issued to the column-command control sequencer 104A. The column-command drive state is the transition from the state in which the activation command is issued (indicated by M1 in FIG. 4).

Referring to FIG. 4, ACT_ST indicates an active state in which the activation command is issued, PCHG_ST indicates a precharge state in which the precharge command is issued, REF_ST indicates a refresh state in which the refresh command is issued, and PALL_ST indicates an all-precharge state in which the all-precharge command is issued. MDS_ST indicates a mode-setting state in which the mode-setting command is issued, and SREF_ST indicates a self-refresh state in which the self-refresh command is issued.

Moreover, in FIG. 4, ACTIVE_PRE indicates a pre-active state before the transition to the state in which the activation command is issued, PCHG_PRE indicates a pre-precharge state before the transition to the state in which the precharge command is issued, REF_PRE indicates a pre-refresh state before the transition to the state in which the refresh command is issued, and PALL_PRE indicates a pre-all-precharge state before the transition to the state in which an all-precharge command is issued. MDS_PRE indicates a pre-mode-setting state before the transition to the state in which the mode-setting command is issued, and SREF_PRE indicates a pre-self-refresh state before the transition to the state in which the self-refresh command is issued.

The all-precharge command is a command to collectively precharge all banks in the memory device 201. The mode-setting command is a command to supply a mode parameter to a mode register. The self-refresh command is a command to perform a self-refresh operation for executing a self-refresh cycle within the memory device 201, which is an SDRAM.

In the states in which the commands are issued, the row-command drive signal 116 and the CS signal 117, the RAS signal 112, the CAS signal 113, the WE signal 114, and the address 115 that are required for each command are controlled to be driven to the command controller 105.

In the previous states before the transitions to the respective states, the row-command drive signal 116 and the RAS signal 112, the CAS signal 113, the WE signal 114, and the address 115 that are required for each command are controlled to be driven to the command controller 105.

The selection as to whether the IDLE state changes to the states in which the respective commands are issued, or to the previous states before the transitions to the respective states is made, based on the load level determined by the decoder 103-1. If it is determined that the load level is low, the IDLE state directly changes to the states in which the respective commands are issued (see S1 to S6 in FIG. 4). On the other hand, if it is determined that the load level is high, the IDLE state temporarily changes to the previous states (see T1 to T5 in FIG. 4), and then changes to the states in which the respective commands are issued (see N1 to N5 in FIG. 4).

The RAS signal 125, the CAS signal 126, the WE signal 127, and the address 128 enter the driven state in each of the previous states. In addition to these signals, a CS signal 130 enters the driven state in the state in which each command is issued.

Next, the operation of the row-command control sequencer 103A will be described, taking the issuing of the refresh command and activation command as examples.

First, for the refresh operation, it is required for the refresh command to drive the CS signal 130, the RAS signal 125, the CAS signal 126, and the address 128. The row-command control sequencer 103A is in the IDLE state when the refresh command is issued. A state transition takes place when the command issue permission 110 is received from the command controller 105.

If it is determined that the load level is low, the IDLE state changes to the refresh state (REF_ST) (S4 in FIG. 4), where the row-command drive signal 116, the CS signal 117, the RAS signal 112, the CAS signal 113, and the address 115 are driven. In the next cycle, the refresh state changes to the IDLE state (S4a in FIG. 4). On the other hand, if it is determined that the load level is high, the IDLE state temporarily changes to the pre-refresh state (REF_PRE) (T3 in FIG. 4), where the row-command drive signal 116, the RAS signal 112, the CAS signal 113, and the address 115 are driven. In the next cycle, the pre-refresh state changes to the refresh state (N3 in FIG. 4), where the row-command drive signal 116, the CS signal 117, the RAS signal 112, the CAS signal 113, and the address 115 are driven. In the next cycle, the refresh state changes to the IDLE state (S4a in FIG. 4).

Thus, if it is determined that the load level is low, the command controller 105 performs control to drive the CS signal 130, the RAS signal 125, the CAS signal 126, and the address 128 to the memory device 201, during one cycle (see W1 in FIG. 6), and if it is determined that the load level is high, the command controller 105 performs control to drive the RAS signal 125, the CAS signal 126, and the address 128 during two cycles (see Y1 in FIG. 7), and drive the CS signal 130 only during the last one cycle.

Next, for active operation, it is required for the activation command to drive the CS signal 130, the RAS signal 125, and the address 128. The row-command control sequencer 103A is in the IDLE state when the activation command is issued. A state transition takes place when the command issue permission 110 is received from the command controller 105.

If it is determined that the load level is low, the IDLE state changes to the active state (ACTIVE_ST) (S2 in FIG. 4), where the row-command drive signal 116, the CS signal 117, the RAS signal 112, and the address 115 are driven. Then, the active state changes to the column-command drive state (COL_START) (M1 in FIG. 4), by which the column-command control sequencer 104A is driven. If there is no subsequent access, the column-command drive state changes to the IDLE state (M2 in FIG. 4).

If it is determined that the load level is high, the IDLE state temporarily changes to the pre-active state (ACTIVE_PRE) (T2 in FIG. 4), where the row-command drive signal 116, the RAS signal 112, and the address 115 are driven. In the next cycle, the pre-active state changes to the active state (ACTIVE_ST) (N2 in FIG. 4), where the row-command drive signal 116, the CS signal 117, the RAS signal 112, and the address 115 are driven. Then, the active state changes to the column-command drive state (COL_START) (M1 in FIG. 4), by which the column-command control sequencer 104A is driven. If there is no subsequent access, the column-command drive state changes to the IDLE state (M2 in FIG. 4).

Thus, if it is determined that the load level is low, the command controller 105 performs control to drive the CS signal 130, the RAS signal 125, and the address 128 to the memory device 201, during one cycle (see W2 in FIG. 6), and if it is determined that the load level is high, the command controller 105 performs control to drive the RAS signal 125 and the address 128 during two cycles (see Y2 in FIG. 7), and drive the CS signal 130 only during the last one cycle.

II. Operation of Column-Command Control Sequencer 104A

Upon receipt of a command from the row-command control sequencer 103A, the column-command control sequencer 104A issues the command issue request 119 to the command controller 105. When the command issue permission 118 is received, a state transition from the IDLE state to a command-issuing state takes place.

As shown in FIG. 5, the column-command control sequencer 104A has the states of issuing a write command, a precharge-write (Write with Precharge) command, a read command, and a precharge-read (Read with Precharge) command. Moreover, the column-command control sequencer 104A has their previous states before the transitions to the respective states.

Here, the precharge-write command is a command for writing data with a bit line precharged. The precharge-read command is a command for reading data with a bit line precharged.

Referring to FIG. 5, RD_CMD indicates a read state in which the read command is issued, RDA_CMD indicates a precharge-read state in which the precharge-read command is issued, WR_CMD indicates a write state in which the write command is issued, and WRA_CMD indicates a precharge-write state in which the precharge-write command is issued. Moreover, RD_PRE indicates a pre-read state before the transition to the state in which the read command is issued, RDA_PRE indicates a pre-precharge-read state before the transition to the state in which the precharge-read command is issued, WR_PRE indicates a pre-write state before the transition to the state in which the write command is issued, and WRA_PRE indicates a pre-precharge-write state before the transition to the state in which the precharge-write command is issued.

In the states in which the commands are issued, the column-command drive signal 123 and the CS signal 124, the CAS signal 120, the WE signal 121, and the address 122 that are required for each command are controlled to be driven to the command controller 105. In the previous states before the transitions to the respective states, the column-command drive signal 123 and the CAS signal 120, the WE signal 121, and the address 122 that are required for each command are controlled to be driven to the command controller 105.

The selection as to whether the IDLE state changes to the states in which the respective commands are issued, or to the previous states before the transitions to the respective states is made, based on the load level determined by the decoder 104-1. If it is determined that the load level is low, the IDLE state directly changes to the states in which the respective commands are issued (see S11 to S14 in FIG. 5). On the other hand, if it is determined that the load level is high, the IDLE state temporarily changes to the previous states (see T11 to T14 in FIG. 5), and then changes to the states in which the respective commands are issued (see N11 to N14 in FIG. 5).

The CAS signal 126, the WE signal 127, and the address 128 enter the driven state in each of the previous states. In addition to these signals, the CS signal 130 enters the driven state in the state in which each command is issued.

Next, the operation of the column-command control sequencer 104A will be described, taking the issuing of the write command and read command as examples.

First, for the issuing of the write command, it is required for the write command to drive the CS signal 130, the CAS signal 126, the WE signal 127, and the address 128. The column-command control sequencer 104A is in the IDLE state when the write command is issued. A state transition takes place when the command issue permission 118 is received from the command controller 105.

If it is determined that the load level is low, the IDLE state changes to the write state (S13 in FIG. 5), where the column-command drive signal 123, the CS signal 124, the CAS signal 120, the WE signal 121, and the address 122 are driven. If there is no subsequent access, the write state changes to the IDLE state (S13a in FIG. 5). On the other hand, if it is determined that the load level is high, the IDLE state temporarily changes to the pre-write state (T13 in FIG. 5), where the column-command drive signal 123, the CAS signal 120, the WE signal 121, and the address 122 are driven. In the next cycle, the pre-write state changes to the write state (N13 in FIG. 5), where the column-command drive signal 123, the CS signal 124, the CAS signal 120, the WE signal 121, and the address 122 are driven. If there is no subsequent access, the write state changes to the IDLE state (S13a in FIG. 5).

Thus, if it is determined that the load level is low, control is performed to drive the CS signal 124, the CAS signal 120, the WE signal 121, and the address 122 to the memory device 201, during one cycle (see W3 in FIG. 6), and if it is determined that the load level is high, control is performed to drive each of the CAS signal 120, the WE signal 121, and the address 122 during two cycles (see Y3 in FIG. 7), and drive the CS signal 130 only during the last one cycle.

In the write state, the output-data timing signal 108 is issued to the data controller 106. In accordance with the timing specified, the data controller 106 outputs data to the memory bus 129.

Next, for the read command operation, it is required for the read command to drive the CS signal 124, the CAS signal 120, and the address 122. The column-command control sequencer 104A is in the IDLE state when the read command is issued. A state transition takes place when the command issue permission 118 is received from the command controller 105.

If it is determined that the load level is low, the IDLE state changes to the read state (S11 in FIG. 5), where the column-command drive signal 123, the CS signal 124, the CAS signal 120, and the address 122 are driven. If there is no subsequent access, the read state changes to the IDLE state (S11a in FIG. 5). On the other hand, if it is determined that the load level is high, the IDLE state temporarily changes to the pre-read state (T11 in FIG. 5), where the column-command drive signal 123, the CAS signal 120, and the address 122 are driven. In the next cycle, the pre-read state changes to the read state (N11 in FIG. 5), where the column-command drive signal 123, the CS signal 124, the CAS signal 120, and the address 122 are driven. If there is no subsequent access, the read state changes to the IDLE state (S11a in FIG. 5).

Thus, if it is determined that the load level is low, control is performed to drive the CS signal 124, the CAS signal 120, and the address 122 to the memory device 201, during one cycle (see W4 in FIG. 6), and if it is determined that the load level is high, control is performed to drive the CAS signal 120 and the address 122 during two cycles (see Y4 in FIG. 7), and drive the CS signal 124 only during the last one cycle.

In the read state, the input-data timing signal 109 is issued to the data controller 106. In accordance with the timing specified, the data controller 106 loads data from the memory bus 129 and returns read data to the command processor 102.

In the present embodiment, as described above, selection/data signals with a low load level, such as CS signals, data signals, and data masks, are always driven during one cycle. On the other hand, the duration in which command/address signals with a high load level, such as RAS signals, CAS signals, WE signals, and addresses, are driven can be switched between one cycle and two cycles, depending on the load level determined from the number of memory devices. That is, the duration in which command/address signals with a high load level are driven can be increased to two cycles to reduce the frequency of variations in the command/address signals. Therefore, even if many memory devices are connected, the system can accommodate a difference in load between the command/address signals and selection/data signals without using expensive memory modules. Using the switching mechanism described above, a system environment best suited for the number of connected memory devices can be achieved.

Second Embodiment

In the second embodiment, the number of memory devices 201 is determined by software instead of a switching circuit. Switching between one-cycle drive and two-cycle drive is also carried out by software.

Figure 8:
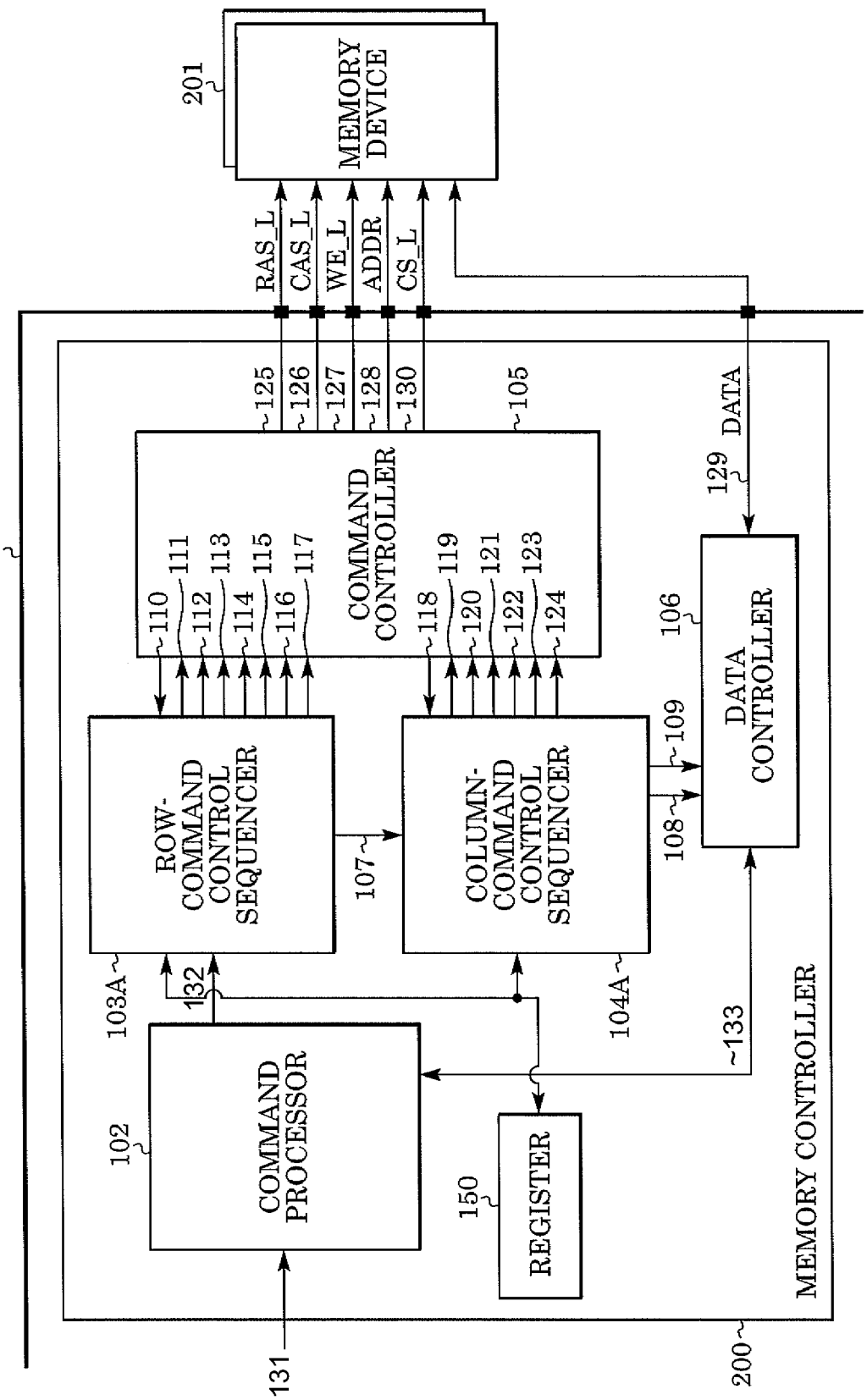
FIG. 8 is a block diagram showing the configuration of a memory controller according to a second embodiment.
Figure 9:
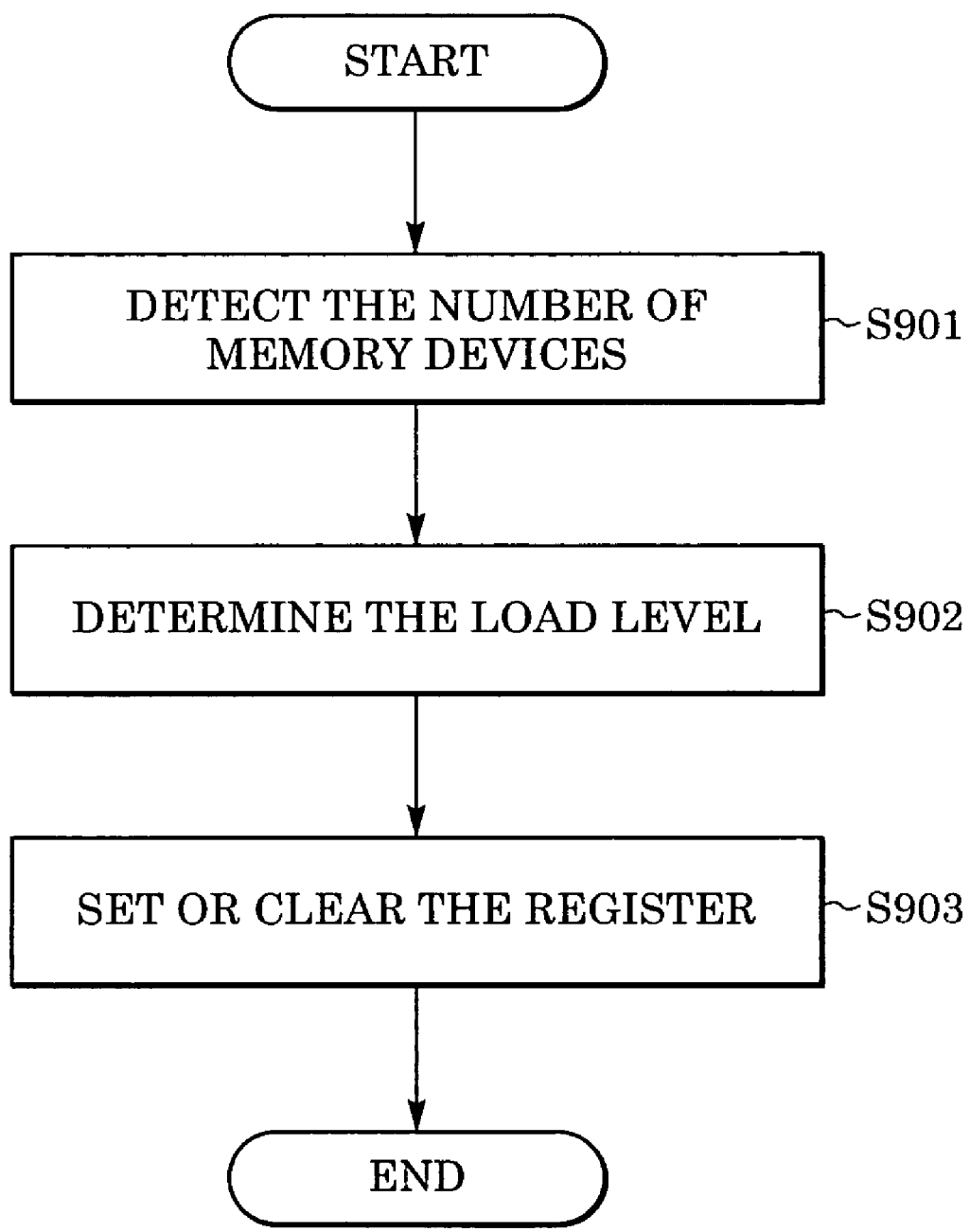
FIG. 9 is a flowchart showing a control procedure of software according to the second embodiment.

FIG. 8 is a block diagram showing the configuration of a memory controller according to the second embodiment. FIG. 9 is a flowchart showing a control procedure of software according to the second embodiment.

A memory controller 200 of the second embodiment includes a register 150 for specifying a load level. The register 150 is set if the load level is high, and is cleared if the load level is low. The cycle of issuing commands can thus be controlled by referring to the register 150, instead of using the mode selector signal MS in the first embodiment. The other configurations are the same as those in the first embodiment.

For example, a DIMM module includes DIMM module information stored in an electrically erasable programmable read-only memory (EEPROM). Software accesses the EEPROM of the DIMM module to detect the number of connected memory devices (step S901). Then, the software determines if the load level is high or low based on whether or not the number of memory devices detected is larger than a threshold value (step S902), and sets or clears the register 150 depending on whether the load level is high or low (step S903), thereby changing the cycle of issuing commands.

In this case, the initial value of the register 150 is set to indicate that the load level is high, and commands are issued during two cycles when the memory device 201 is initialized. If it is determined that the load level is low, the register 150 is cleared to change the command issuing cycle.

The present invention is not to be considered limited to the embodiments described above, but various changes may be made without departing from the scope of the invention. For example, the memory controller 200 can be provided in any configuration as long as the number of output cycles of command/address signals can be changed based on the load level.

According to the embodiments described above, negative effects resulting from the delay of command/address signals caused by the load when many memory devices are connected can be compensated, and many memory devices can be connected at low cost.

The present invention is not limited to the embodiments described above, but is applicable to a general-purpose computer (such as a personal computer and a large computer (mainframe)) that can be used for many purposes (e.g., scientific and engineering calculations, business processing, and control operations) depending on the software. The present invention is also applicable to a special-purpose computer with an optimization algorithm to solve the optimization problem only.

The present invention is applicable to any configuration as long as the functions of the embodiments described above can be achieved. For example, software and hardware configurations in the embodiments can be replaced as required.

In the present invention, a storage medium (or recording medium) on which a software program code for performing the functions of the above-described embodiments is recorded may be supplied to a system or apparatus such that a computer (or central processing unit (CPU) or micro-processing unit (MPU)), that is, the system or apparatus reads out and executes the program code stored in the storage medium. In this case, the program code read out from the storage medium performs the functions of the above-described embodiments, so that the storage medium storing the program code constitutes the present invention. The functions of the above-described embodiments can be performed not only by a computer reading and executing the program code, but also by an operating system (OS) running on the computer and executing a whole or part of the actual processing in accordance with instructions of the program code.

The functions of the above-described embodiments can also be performed, after the program code read out from the storage medium is written in a function expansion card in a computer or is written in a memory of an expansion unit connected to a computer, by a CPU or the like, which is included in the function expansion card or expansion unit, executing a whole or part of the actual processing in accordance with instructions of the program code. For applying the present invention to the storage medium, a program code corresponding to the above-described flowchart is stored in the storage medium.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

This application claims priority from Japanese Patent Application No. 2004-166339 filed Jun. 3, 2004, which is hereby incorporated by reference herein.

What is claimed is:

1. A memory access control apparatus comprising:
   an obtaining unit configured to obtain a load state corresponding to a number of memory devices;
   a setting unit configured to set, depending on whether the load state is low or high, a first or second number of cycles of issuing signals for controlling access to the memory devices, respectively, wherein the second number is greater than the first number; and
   a control unit configured to control access to the memory devices by issuing the signals at the set number of cycles.

2. The memory access control apparatus according to claim 1, wherein the obtaining unit obtains the load state based on the state of signals inputted from outside of the apparatus.

3. The memory access control apparatus according to claim 1, wherein the obtaining unit obtains the load state based on a set value of a register.

4. An information processing system comprising:
   a memory access control apparatus including:
   an obtaining unit configured to obtain a load state corresponding to a number of memory devices;
   a setting unit configured to set, depending on whether the load state is low or high, a first or second number of cycles of issuing signals for controlling access to the memory devices, respectively, wherein the second number is greater than the first number; and
   a control unit configured to control access to the memory devices by issuing the signals at the set number of cycles;
   a load-determining unit configured to determine the load state corresponding to the number of memory devices; and
   an informing unit configured to inform the memory access control apparatus of the load state determined by the load-determining unit.

5. The information processing system according to claim 4, wherein the load-determining unit determines the load state based on the state of a switch.

6. The information processing system according to claim 4, further comprising a detecting unit configured to detect the number of memory devices by accessing the memory devices, wherein the load-determining unit determines the load state based on the number of memory devices detected by the detecting unit.

7. The information processing system according to claim 4, wherein the informing unit informs the memory access control apparatus of the load state through the use of the state of signals outputted to the memory access control apparatus.

8. The information processing system according to claim 4, wherein the informing unit informs the memory access control apparatus of the load state by controlling a register in the memory access control apparatus.

9. A memory access control apparatus comprising:
an obtaining unit configured to obtain a load state corresponding to a number of memory devices;
a determining unit configured to determine an operation state transition for command processing so that the operation state directly changes to a command execution state when the load state is low, and the operation state changes to a previous state of the command execution state before the command execution state when the load state is high; and
an access control unit configured to control an access operation to the memory devices based on the determined state transition.

10. The memory access control apparatus according to claim 9, wherein in the command execution state, signals of high and low load levels are issued, and in the previous state of the command execution state, a signal of high load level is issued.

11. The memory access control apparatus according to claim 9, wherein the obtaining unit obtains the load state based on the state of signals inputted from outside of the apparatus.

12. The memory access control apparatus according to claim 9, wherein the obtaining unit obtains the load state based on a set value of a register.

13. An information processing system comprising:
a memory access control apparatus including:
an obtaining unit configured to obtain a load state corresponding to a number of memory devices;
a determining unit configured to determine an operation state transition for command processing so that the operation state directly changes to a command execution state when the load state is low, and that the operation state changes to a previous state of the command execution state before the command execution state when the load state is high; and
an access control unit configured to control access to the memory devices based on the determined state transition;
a load-determining unit configured to determining the load state corresponding to the number of memory devices; and
an informing unit configured to inform the memory access control apparatus of the load state determined by the load-determining unit.

14. The information processing system according to claim 13, wherein the load-determining unit determines the load state based on the state of a switch.

15. The information processing system according to claim 13, further comprising a detecting unit configured to detect the number of memory devices by accessing the memory devices, wherein the load-determining unit determines the load state based on the number of memory devices detected by the detecting unit.

16. The information processing system according to claim 13, wherein the informing unit informs the memory access control apparatus of the load state through the use of the state of signals outputted to the memory access control apparatus.

17. The information processing system according to claim 13, wherein the informing unit informs the memory access control apparatus of the load state by controlling a register in the memory access control apparatus.

18. A memory access control method comprising:
obtaining a load state corresponding to the number of memory devices;
setting, depending on whether the load state is low or high, a first or second number of cycles of issuing signals for controlling access to the memory devices; and
controlling access to the memory devices by issuing the signals at the set issuing cycle.

19. A computer-readable storage medium storing a computer-executable program for causing a computer to perform the method of claim 18.

20. A memory access control method comprising:
obtaining a load state corresponding to a number of memory devices;
determining an operation state transition for command processing so that the operation state directly changes to a command execution state when the load state is low, and that the operation state changes to a previous state of the command execution state before the command execution state when the load state is high; and
controlling an access operation to the memory devices based on the determined state transition.

21. A computer-readable storage medium storing a computer-executable program for causing a computer to perform the method of claim 20.

* * * * *